Figures 1, 2:
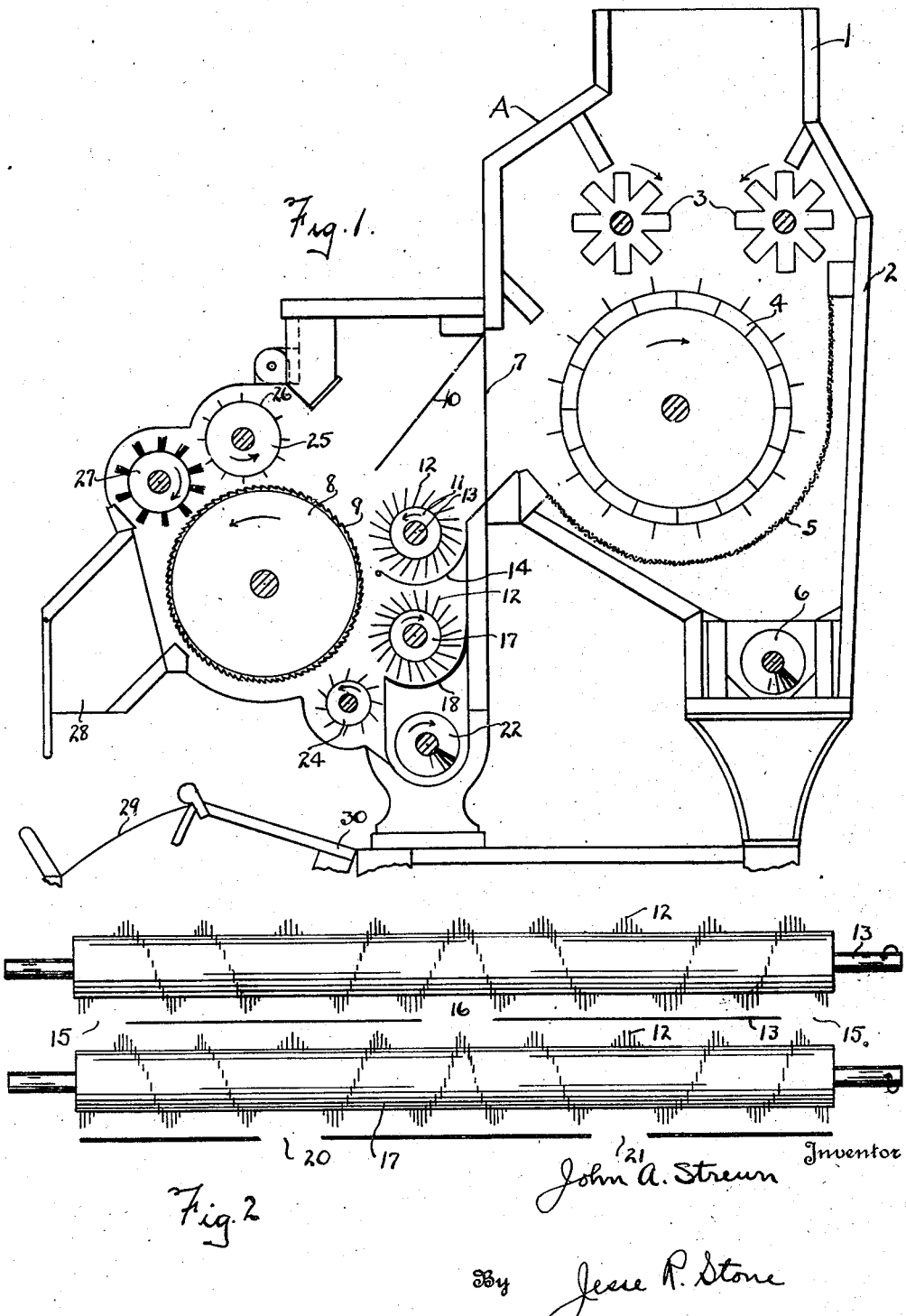

Dec. 7, 1926.

J. A. STREUN 1,610,222

COTTON HULL SEPARATOR

Filed July 6, 1926

John A. Streun Inventor

By Jesse P. Stone Attorney

Patented Dec. 7, 1926.

1,610,222

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

COTTON-HULL SEPARATOR.

Application filed July 6, 1926. Serial No. 120,637.

My invention relates to hull separators for cleaning cotton of the hulls and chaff before the cotton is fed to the gin.

It is an object of the invention to provide a hull separator which will handle the cotton in large quantities, and at a higher rate of speed than ordinary cleaners of this nature. It is desired that the construction be a simple one, but that the capacity for hulling the material be increased over that of other similar types of separators.

In the drawing, I have shown a construction similar to that shown in my previous Patent No. 1,563,596, granted December 1st, 1925, but modified to carry out my invention. Fig. 1 is a side elevation of a huller gin with one side removed and the ends of the shafts of the rollers and cylinders in section. Fig. 2 is a front elevation of the toothed conveyor cylinders and the troughs beneath them, illustrating the arrangement of the teeth upon the cylinders.

In carrying out my invention, I contemplate the use of my separator in combination with the usual old type of cleaner indicated at A in Fig. 1. This cleaner is for removing dirt from the cotton before it is hulled. It has a hopper 1 at the upper end of a housing 2 with two feeder rolls 3 beneath the hopper, said rolls being rotatable to feed the cotton from the hopper gradually to a picker cylinder 4 below the feeder rolls.

There is a foraminated screen 5 below said picker cylinder, said screen being secured to cleats at the rear of, and below, said cylinder, so that it is spaced from the housing and it conforms in curvature approximately to the curvature of the cylinder. The dirt passing through the screen is directed by the housing to a screw conveyor 6 which rotates to move the dirt from the housing.

The cotton from the cleaner is moved through a lateral opening 7 in the housing to the huller or separator. Supported within the housing of the separator is a saw cylinder 8, said cylinder having teeth thereon directed forwardly in the direction of its rotation.

Directly in front of the opening 7 to the separator is an inwardly inclined baffle plate 10 extending downwardly to a point spaced from the saw cylinder, as shown. Below this baffle is the upper conveyor roll 11, said roll being mounted on a shaft 13 and rotatable in a counter-clockwise direction. It has rearwardly inclined pins or teeth 12 thereon. Below said conveyor roll is a sheet metal trough 14. Said trough is secured to the housing at its side away from the saw cylinder, and is cut away at its ends and also at a middle point to provide discharge openings 15 at the ends and 16 centrally thereof, as shown in Fig. 2. The teeth 12 upon the conveyor roll are arranged spirally to move the cotton and hulls toward the openings 15 and 16 in the trough as the roll is rotated; and I find the capacity of the machine is greatly increased and the cotton maintained in a more even and uniform layer where the cotton is moved to the central opening 16 as well as toward the ends.

There is a second conveyor roll 17 below the roll 11 and the lower roll is rotatable in a clockwise direction and has the pins 12 thereon directed rearwardly as in case of the upper roll. Below roll 17 is a trough 18 of foraminated sheet metal with discharge openings 20 and 21 therein at points which divide the trough into three approximately equal lengths, the openings being offset from the openings 15 and 16 above. The spirally arranged teeth 12 are arranged on the roll to move the hulls toward the openings 20 and 21 from both sides. The foraminations in the trough allow chaff and dirt to pass through the same and a conveyor 22 discharges it from the housing.

The conveyor rolls 11 and 17 are closely adjacent the saw cylinder 8 and move the cotton and hulls along the face of the saw cylinder so that the lint can be caught by the saw and removed from the hulls, which are discharged from the upper trough through the openings 15 and 16 to the lower roll and are then moved to the openings 20 and 21, where they fall upon the conveyor 22, the cotton being entirely removed from the hulls in their movement along the face of the saw cylinder.

Below the level of the roll 17, and forwardly thereof, is a small picker roll 24 which rotates to carry any cotton or hulls upwardly toward the saw cylinder and the roll 17. This adds to the agitation given to the hulls and the cotton, and assists in elimination of the hulls.

Above the saw cylinder is a knocker roll 25 acting to prevent the hulls from being carried over with the cotton. It has flights 26 thereon which extend closely adjacent the saw cylinder.

The cotton is removed from the teeth of the saw cylinder by means of a brush roll 27, which throws the cotton downwardly and forwardly to the chute 28 which discharges the cotton to the huller breast 29 of the gin 30, the upper end of which is indicated in the drawing.

The cotton entering the separator from the cleaner A will be received in an even layer the full length of the roll 11 upon which it will be directed by the baffle 10. The rotation of roll 11 will move the cotton and hulls toward the openings 15 and 16 in the trough 13 and as the openings are three in number the discharge of the cotton will be rapid and the cotton will not be allowed to bunch together. When, therefore, it is fed to the gin it will be in a uniform bat, easily ginned.

The use of two of the rolls with the teeth in spirals so arranged as to move the cotton toward the openings will suffice to clean all the hulls free of cotton lint before the hulls are discharged and will greatly increase the capacity of the machine over ordinary separators.

The particular combination of elements as described is a most effective one in the rapid and efficient treatment of the cotton which is to be ginned.

Having thus described my invention, what I claim as new and desire to protect by Letters Patent is:

1. A hull separator for cotton including a housing, a saw cylinder, means to clean said cotton and feed it to said housing, a baffle to direct said cotton toward said cylinder, two superposed conveyor rolls below said baffle, and adjacent said cylinder, the upper of said rolls having a trough below it with discharge openings therein at both ends and centrally thereof, the lower roll having a foraminated trough with discharge openings at two points offset from the position of the openings in the upper trough, teeth on said rolls arranged to move the hulls toward said openings, means adjacent said cylinder at its upper and lower sides to throw the hulls toward said conveyor rolls, and means to remove the cotton from said saw cylinder.

2. A hull separator for cotton including a housing, a saw cylinder, means to feed said cotton to said housing, a baffle to direct said cotton toward said cylinder, two superposed conveyor rolls below said baffle, and adjacent said cylinder, the upper of said rolls having a trough below it with discharge openings therein at both ends and centrally thereof, the lower roll having a foraminated trough with discharge openings at two points offset from the position of the openings in the upper trough, teeth on said rolls arranged to move the hulls toward said openings, a picker roll below said conveyor rolls and adjacent said cylinder and a knocker roll above said cylinder to throw the hulls toward said conveyor rolls, and means to remove the cotton from said saw cylinder.

3. A hull separator for cotton including a housing, a saw cylinder rotatable therein, said housing having a feeding opening above said cylinder at one side thereof, a downwardly-inclined baffle within said opening, a plurality of conveyor rolls below said baffle adjacent said cylinder, troughs beneath said rolls, each of said troughs having a plurality of discharge openings therein, the openings in each trough being offset from the openings of the adjacent one, spirally mounted teeth on said rolls arranged to move the cotton and hulls toward said discharge openings, means to prevent the hulls from passing said saw cylinder and means to discharge the cotton from said cylinder and said housing.

4. A hull separator for cotton including a housing, a saw cylinder rotatable therein, said housing having a feeding opening above said cylinder at one side thereof, means to direct the cotton toward said cylinder, two conveyor rolls below said means adjacent said cylinder, troughs beneath said rolls, each of said troughs having a plurality of discharge openings therein, the openings in each trough being offset from the openings of the adjacent one, spirally mounted teeth on said rolls arranged to move the cotton and hulls toward said discharge openings, means to prevent the hulls from passing said saw cylinder and means to discharge the cotton from said cylinder and said housing.

In testimony whereof I hereunto affix my signature this 1st day of July A. D. 1926.

JOHN ARNOLD STREUN.